(12) United States Patent  
Cocking

(10) Patent No.: US 7,828,942 B2
(45) Date of Patent: Nov. 9, 2010

(54) ELECTROCHEMICAL TREATMENT OF AN AQUEOUS SALT SOLUTION

(75) Inventor: Charles A. B. Cocking, South Pool (GB)

(73) Assignee: PuriCore, Inc., Malvern, PA (US)

(*) Notice: Subject to any disclaimer, the term of this patent is extended or adjusted under 35 U.S.C. 154(b) by 1199 days.

(21) Appl. No.: 11/369,981

(22) Filed: Mar. 8, 2006

(65) Prior Publication Data

US 2006/0278585 A1 Dec. 14, 2006

Related U.S. Application Data

(63) Continuation of application No. 10/530,115, filed on Apr. 1, 2005, now abandoned.

(30) Foreign Application Priority Data

Oct. 3, 2002 (GB) ................. 0222961.5

(51) Int. Cl.
*C25B 9/00* (2006.01)
*C25B 1/26* (2006.01)
*C02F 1/461* (2006.01)
(52) U.S. Cl. ............... 204/263; 204/252; 210/748.2
(58) Field of Classification Search ............. None
See application file for complete search history.

(56) References Cited

U.S. PATENT DOCUMENTS

| 4,491,903 | A | * | 1/1985  | Montague ............ 363/48   |
| 5,002,528 | A | * | 3/1991  | Palestrant .......... 604/28   |
| 5,445,722 | A | * | 8/1995  | Yamaguti et al. ... 204/228.6 |
| 5,482,605 | A | * | 1/1996  | Taylor ............. 204/224 R |
| 5,571,396 | A | * | 11/1996 | Cormier et al. ..... 204/418  |
| 6,117,285 | A |   | 9/2000  | Welch et al.                  |
| 6,241,893 | B1|   | 6/2001  | Levy                          |

| 6,267,885 | B1 | 7/2001 | Briggs et al. |

(Continued)

FOREIGN PATENT DOCUMENTS

EP 1074515 2/2001

(Continued)

OTHER PUBLICATIONS

International Search Report for PCT/GB03/04263.

*Primary Examiner*—Harry D Wilkins, III
(74) *Attorney, Agent, or Firm*—Stradley Ronon Stevens & Young, LLP

(57) ABSTRACT

A device (10) for producing a biocidal solution has a sealed and replaceable reservoir (16) with a low volume capacity which contains pre-prepared aqueous salt solution (18) with a pre-determined concentration, an electrolytic cell (20) for electrochemically treating the salt solution (18), a pump (28) for delivering a flow of accurately measured volumes of the salt solution (18) to the electrolytic cell (20), a restrictor valve (36) for controlling further the flow rate of the salt solution (18) to a cathode chamber (24) of the electrolytic cell (20), an electrical circuit (46) for connecting the pump (28) and the electrolytic cell (20) to a mains supply source (48) and including a power pack (50) for providing a substantially constant direct current of (7) to (12) amps to the electrolytic cell (20) and an operator-controlled switch (52) for completing the electrical circuit (46) when the switch (52) is operated to produce a biocidal solution (12) having a predetermined level of available free chlorine and pH.

12 Claims, 8 Drawing Sheets

U.S. PATENT DOCUMENTS

| | | | |
|---|---|---|---|
| 6,296,744 B1 | 10/2001 | Djeiranishvili et al. | |
| 6,632,347 B1 * | 10/2003 | Buckley et al. | 205/620 |
| 7,303,660 B2 * | 12/2007 | Buckley et al. | 204/232 |
| 2004/0055896 A1 * | 3/2004 | Anderson et al. | 205/701 |
| 2004/0065542 A1 * | 4/2004 | Fairfull et al. | 204/228.2 |

FOREIGN PATENT DOCUMENTS

| | | |
|---|---|---|
| GB | 1 298 812 | 12/1972 |
| GB | 2352728 | 7/2001 |

* cited by examiner

ELECTROCHEMICAL TREATMENT OF AN AQUEOUS SALT SOLUTION

CROSS-REFERENCE TO RELATED APPLICATIONS

The present application is a continuation application of U.S. patent application Ser. No. 10/530,115, filed on Apr. 1, 2005, now abandoned which is a national stage application of PCT/GB2003/004263 filed Oct. 3, 2003, which claims priority to UK Patent Application Serial No. 0222961.5 filed on Oct. 3, 2002. All applications are incorporated by reference herein.

The present invention relates to a device for producing a biocidal solution by electrolytic treatment of an aqueous salt solution.

Sterilising, or biocidal, solutions are commonly used for hard surfaces when microbial action against spores, viruses, fungi and bacteria is required. They remove biofilms and eliminate further growth. These solutions have a broad range of applications in both the medical and non-medical environments such as the preservation of poultry and fish, general agricultural and petrochemical uses, the breaking down of biofilm, water treatment and general disinfection in medical and veterinary applications, basically any application in which there is a desire to free a surface from living organisms.

Conventional biocidal solutions include formaldehyde, peracetic acid and glutaraldehyde which may have sensitising properties to the handler, irritate the skin and may be harmful to humans. These conventional solutions have limited applications due to their toxic nature and handling precautions.

In order to avoid these disadvantages, biocidal solutions produced by the electrolysis of saline are preferred. These solutions are often called 'superoxidised water solutions'. Superoxidised water solutions are non-toxic and are biocidal against a wide range of bacteria, fungi, viruses and spores. Because these solutions are extremely effective in cold sterilising and are free from highly toxic chemicals, they present reduced handling risk and have a wide range of applications including food preparation and medical areas such as sterilisation of heat sensitive medical equipment.

The pH, redox potential, salt concentration and available free chlorine (AFC) content of these solutions vary according to the purpose of the solution, the equipment in which it is produced and currently held theories as to what types of solution are most effective. The suitability of a particular composition of superoxidised water solution for a particular application is dependent on the susceptibility to corrosion of the hard surfaces being treated and the extent of the biocidal treatment required. In deciding on an appropriate composition, a balance must always be struck between a solution having a high enough concentration of AFC or redox potential to be sufficiently biocidal, but not so high as to corrode or otherwise damage any equipment which is being sterilised.

An AFC content of about 3 ppm to 300 ppm generally provides biocidal properties for most envisaged applications. For example, the sterilisation of heat sensitive medical instruments has been found to be most effective when using a superoxidised water solution with an AFC level of approximately 100 to 250 ppm at a pH of between about 5 and 7. The biocidal efficacy of the solution is also strongly dependent on its pH. By way of example, a pH of about 5 is suitable for use in treating venous leg ulcers to reduce bacterial infection, while a pH of between 5 and 7 is more suitable for use in the disinfection and sterilisation of heat-sensitive endoscopes. To avoid deterioration of pH sensitive material, a neutral pH of approximately 7 may be appropriate. Other applications, for example in the processing of poultry and fish and general agricultural and petrochemical uses, the breaking down of bacterial biofilm and water treatment, may demand different levels of AFC and pH.

Superoxidised water solutions are generated by passing saline through an electrolytic cell comprising an anode chamber, a cathode chamber and a separator. The resultant super oxidised water contains AFC in the form of a mixture of oxidising species, predominantly hypochlorous acid (HOCl) and sodium hypochlorite, and is characterised by its pH, AFC content and redox level. Such reactive species have a finite life and so, while the pH of the solution will usually stay constant over time, its biocidal efficacy will decrease with age.

At the anode, water acidity increases from its initial neutral pH to pH 2 to 6 due to formation of stable and non-stable acids and a number of intermediate compounds formed during the spontaneous decomposition and reaction of the acids. The solution during and after anodal electrochemical treatment is called anolyte. At the cathode, saline goes from an initial neutral pH to a pH of 7.5 to 12 due to conversion of part of the dissolved salts into hydroxides. The solution during and after cathodal electrochemical treatment is called catholyte.

It is important to be able to control to a fine degree the final composition of any biocidal solution produced. As stated earlier, the solution must have a high enough concentration of AFC to be sufficiently biocidal, but not so high as to corrode or otherwise damage any equipment which is being sterilised. This is especially important when one considers that many of the applications of biocidal solutions are in maintaining the health of a population. As will be readily appreciated, a biocidal solution which does not meet the required level of biocidal efficacy carries a risk of allowing the object to be sterilised to spread infection e.g. a medical instrument.

Many systems exist for producing biocidal solutions but in the Applicant's experience, none of these systems is suited to providing a wholly reliable or autonomous low volume supply of biocidal solution as they are susceptible to many variable factors such as the variability of incoming water supplies, degree of electrolysis in the electrolytic cells, the concentration of dissolved salts and minerals and the flow rates, and fluctuations in electricity supply. In order to overcome these factors, the systems require complicated installation and calibration which is a time-consuming and laborious task and adds to the cost of the machine.

Accordingly, the main object of the present invention is to provide an improved system for reliably and economically delivering low volume biocidal solutions with the desired biocidal properties.

To this end, the present invention resides in a device for producing a biocidal solution including:
  a support frame;
  a sealed and replaceable reservoir having a low volume capacity, adapted to be mounted to the support frame and containing a pre-prepared aqueous salt solution having a pre-determined concentration;
  means for breaking the seal of the reservoir when the reservoir is mounted to the support frame;
  an electrolytic cell for electrochemically treating the aqueous salt solution, that is mounted to the support frame, that is connectible to the reservoir, and that has an anode chamber for delivering a biocidal solution from the electrolytic cell, and a cathode chamber, said anode and cathode chambers being separated by a separator;
  a pump, mounted to the support frame and in communication with the reservoir when the reservoir is mounted to the support frame, for delivering a flow of accurately measured volumes of the aqueous salt solution from the reservoir to the anode and the cathode chambers of the electrolytic cell to control the flow rate of the aqueous salt solution to the electrolytic cell, said pump being in communication with the reservoir through a main feed line made from a flexible and resilient material and to the anode and cathode chambers by an anode feed line and a cathode feed line respectively;

a restrictor valve incorporated in the cathode feed line for controlling further the flow rate of the aqueous salt solution to the cathode chamber;

dispensing means for receiving the biocidal solution from an anode chamber outlet;

a waste reservoir for receiving an output from the cathode chamber outlet;

an electrical circuit for connecting the pump and the electrolytic cell to a mains supply source;

a power pack included in the electrical circuit between the electrolytic cell and the mains supply source to provide a substantially constant direct current of 7 to 12 amps to the electrolytic cell; and an operator-controlled switch included in the electrical circuit for completing the electrical circuit when the switch is operated;

whereby operation of the switch energises the pump to deliver the flow of aqueous salt solution and the electrolytic cell to produce the biocidal solution having a predetermined level of available free chlorine and pH.

By means of the invention, there is produced a biocidal solution which is suitable for low volume applications and which has a predetermined level of AFC and pH.

Advantageously, the biocidal solution is supplied on-site and in low volumes which is necessary due to the short lifetime of the oxidising species therein. For the purposes of this specification, low volume is defined as a device having a reservoir volume of less than or equal to 30 liters.

Beneficially, the device is compact and easily portable thus making it suitable for applications where free space is limited such as in dental and health clinics, laboratories, and commercial kitchens. The compactness of the device enables it to be mounted under existing work tops or even to be used as a worktop device.

The biocidal solution is preferably made using a solution of sodium chloride (saline) as the aqueous salt solution. The resultant biocidal solution is non-toxic and has no handling precautions. The non-toxicity of the biocidal solution together with the low volume dispensed makes it ideal for use in laboratories, clinics, and food factories as a hand steriliser. As the AFC level and pH of the biocidal solution produced is predetermined and reliable, the risk of spreading contamination in any application is minimised. The AFC levels and pH of the biocidal solution can be evaluated daily using a simple AFC and pH test as quality assurance.

The device is easy to install as plumbing is not required, it need only be plugged into the mains supply source. Maintenance of the device is relatively simple and trouble-free as the device does not incorporate any computerisation to produce the biocidal solution. This also makes the device relatively cheap to manufacture. This non-computerisation renders the device particularly suitable for use in industries which have heavy regulatory procedures, for example, the pharmaceutical industry which requires a computerised device to go through approximately two or more years of internal audit and validation.

By means of the invention, the flow rate of saline through the electrolytic cell, the constant saline concentration and the substantially constant current across the cell enables the accurate control and reliability of the final AFC level and pH of the biocidal solution.

The reservoirs of pre-prepared saline ensure a constant concentration of saline which is not affected by evaporation of the water in the solution.

A peristaltic pump may be used which provides the precise metering of the flow rate of saline to the cell. The use of a peristaltic pump guards against contamination of the saline since it flows from the reservoir to the electrolytic cell as the saline does not contact the pump directly, but passes through the pump in tubing. In this way, maintenance of the device is also simple as tube blockages in the pump can be easily identified, if transparent tubing is used, and only the tubing replaced. Also, the peristaltic pump does not require calibration as it is self-priming. Alternatively, a positive displacement pump may be used.

Advantageously, the power pack comprises a transformer and a bridge rectifier which provides a substantially constant current across the cell. The power pack compensates for increased resistance in the cell, due to scale deposited in the cell over time and use, by adjusting the voltage to ensure a constant current.

The AFC content of the biocidal solution may be varied simply by adjusting the flow rate of the saline through the electrolytic cell and the current applied across the cell. The relationship between the applied current and the flow rate is such that if both the current and the flow rate are increased, the AFC of the biocidal solution will remain roughly the same. Conversely, a weaker biocidal solution will be obtained if the current is reduced but the flow rate is kept the same, or if the current is kept the same and the flow rate is increased. The desired current depends on the size of the cell, e.g. the anode surface area, and the type of cell being used, e.g. the material of the electrodes and the type of active coatings on the electrodes if any.

Moreover, the pH of the biocidal solution is controlled by the flow rate of the saline through the cathode chamber. The output from the cathode chamber is discarded rather than being re-fed into system which makes the device simpler to manufacture and service.

In summary, the Applicant has invented a system which is adapted always to deliver biocidal solution falling within a desired specification on demand for low volume applications. Such low volume applications include commercial kitchens (in schools, hospitals, restaurants, hotels etc.), dentists, doctors, veterinary clinics, hospital wards, nursing homes, hairdresser salons, dermatological applications (treating nail fungus, acne etc.), supermarkets, fresh fruit and vegetable vendors. Further applications include aircraft where the biocidal solution can be produced and used to decontaminate the aircraft by spraying the biocidal solution to sterilise airborne bacteria making ice from the biocidal solution for use in night clubs, and fish counters in supermarkets and fishmongers. The device also lends itself to military applications where the biocidal solution can be produced in the field and used for wound cleansing, decontamination of water systems and against the spread of anthrax and small pox. The biocidal solution has also been found to enhance the shelf-life of cut flowers and so the device for producing biocidal solution also has applications in supermarkets, florists, service stations and other cut flower vendors. The simplicity of the device renders it suitable for many more applications than the traditional devices for producing biocidal solutions which tend to be bulkier and more expensive and complex.

In order that the invention may be more readily understood, embodiments thereof will now be described, by way of example, with reference to the accompanying drawings, in which:—

Figure 1:
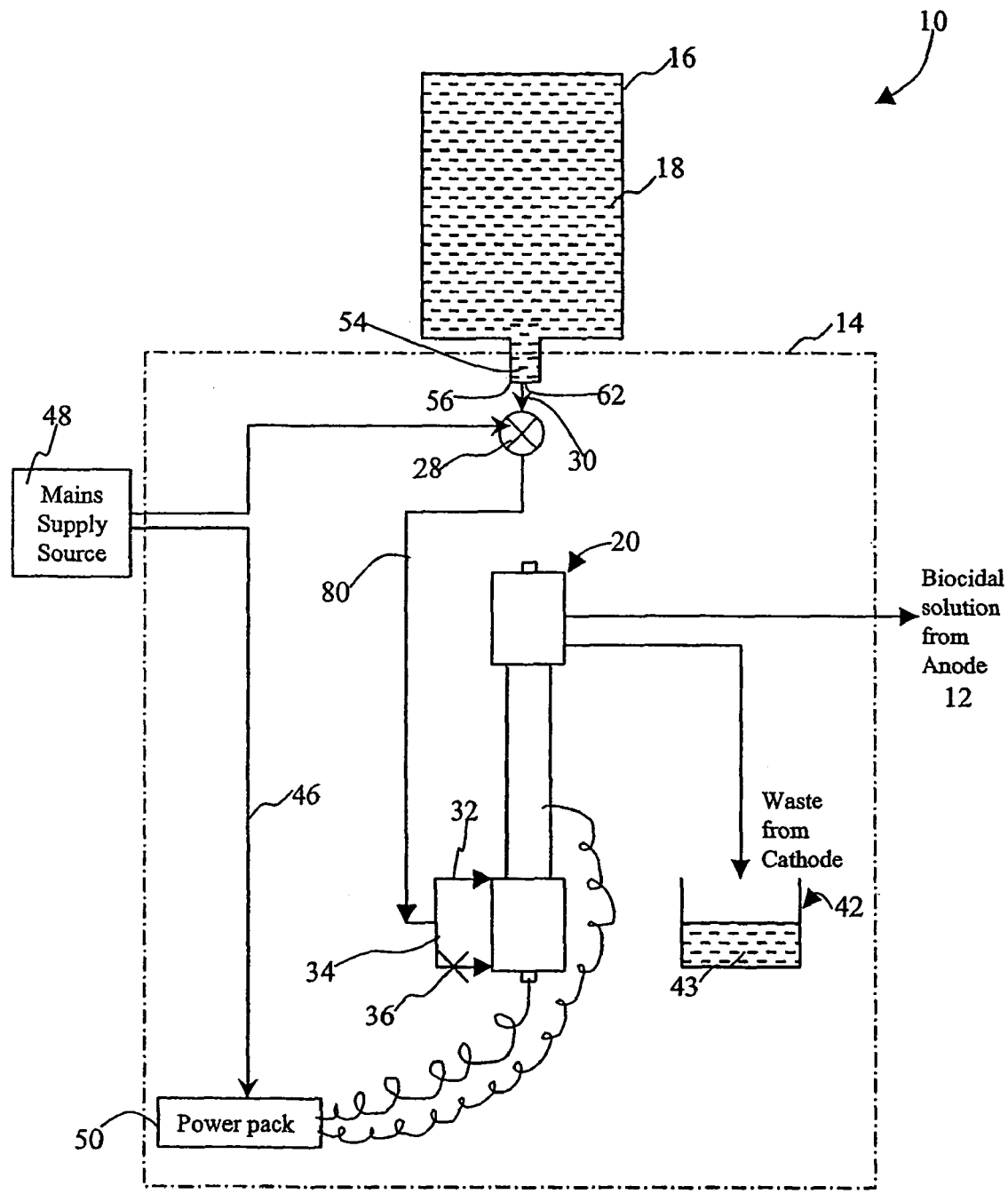
FIG. 1 is a schematic view of a first embodiment of a low volume biocidal solution dispenser device, in accordance with this invention.
Figure 3:
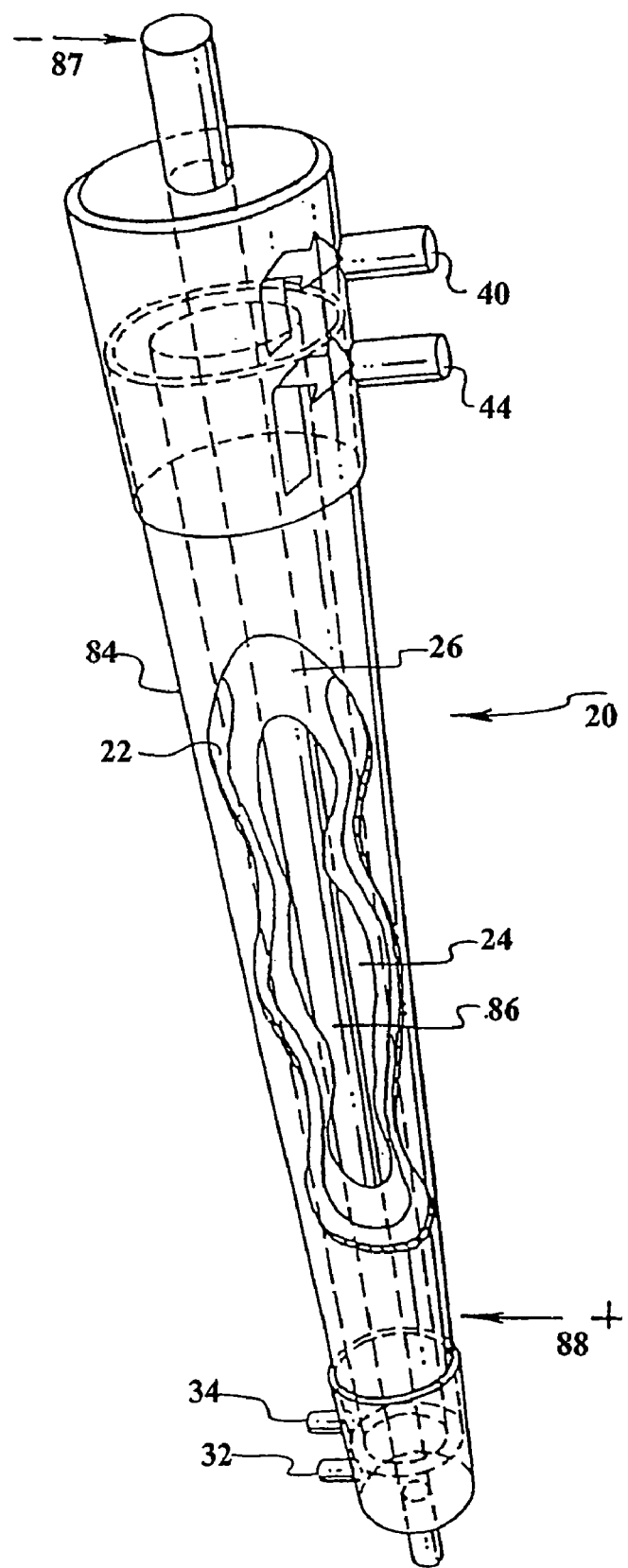
FIG. 3 is an electrolytic cell for use in the embodiment of FIG. 1.

Referring firstly to FIG. 1 there is shown a device 10, for producing a biocidal solution, where indicated at 12, including a support frame 14, shown for clarity of illustration in chain lines, and a sealed and replaceable reservoir 16 having a low volume capacity, mounted to the support frame and containing an aqueous salt solution 18 of a pre-prepared concentration. An electrolytic cell 20 is provided for electrochemically treating the aqueous salt solution 18 that is mounted to the support frame 14 and that is connectible to the reservoir 16. The electrolytic cell 20 has an anode chamber 22, for delivering a biocidal solution 12 from the electrolytic cell 20, and a cathode chamber 24 (both chambers are shown in FIG. 3). The anode 22 and cathode chambers 24 are separated by a separator 26 (see FIG. 3). A peristaltic pump 28 is also included in the device 10, mounted to the support frame 14, for delivering a flow of accurately measured volumes of the aqueous salt solution 18 from the reservoir 16 to the anode 22 and the cathode chambers 24 of the electrolytic cell 20 to control the flow rate of the aqueous salt solution 18 to the electrolytic cell 20. The pump 28 is connected to the reservoir 16 by a main feed line 30 made from a flexible and resilient material and to the anode 22 and cathode chambers 24 by an anode feed line 32 and a cathode feed line 34 respectively, via a feed line 80. A restrictor valve 36 is incorporated in the cathode feed line 34 for controlling further the flow rate of the aqueous salt solution 18 into the cathode chamber 24. The device 10 also has a dispensing means 38 (see FIG. 4) for receiving the biocidal solution 18 from an anode chamber outlet 40 (see FIG. 3), a waste reservoir 42 for receiving an output 43 from the cathode chamber outlet 44 (see FIG. 3), and an electrical circuit 46 for connecting the pump 28 and the electrolytic cell 20 to a mains supply source 48. A power pack 50 is provided in the electrical circuit 46 between the electrolytic cell 20 and the mains supply source 48 to supply a substantially constant direct current of 10 amps to the electrolytic cell 20. The electrical circuit 46 also includes an operator-controlled switch 52 (shown in FIG. 4) for completing the electrical circuit when the switch 52 is operated.

Operation of the switch 52 energises the pump 28 to deliver the flow of aqueous salt solution 18 and the electrolytic cell 20 to produce the biocidal solution 12 having a predetermined level of available free chlorine and pH. The electrolytic cell 20 is mounted substantially vertically in the support frame 14 and the salt solution 18 enters through the bottom of the cell 20 to allow any gases formed in the chambers 22, 24 during electrolysis to escape vertically through the anode and cathode chamber outlets 40, 44.

The aqueous salt solution 18 is saline having a concentration which is chosen and pre-prepared and depends upon the intended use of the biocidal solution and therefore the required AFC and pH level of the biocidal solution 12. A biocidal solution 12 having a pH of between 6.2 and 6.5 and an AFC level of between 150 to 420 ppm and typically of between 370 to 420 ppm (assessed over five assays) is used by the Applicant for low volume biocidal applications in medicine and catering. To achieve this, a saline concentration of 3.5 grams NaCl per liter of softened water is employed. The resultant solution has a conductivity of 7.1. Generally for most applications in medicine and catering, concentrations of saline within the range of 2 to 10 grams of sodium chloride (NaCl) per liter of water are preferred.

An 18 liter capacity saline reservoir 16 is used in the embodiment of FIG. 1. However, any reservoir of low volume capacity may be used, for example 8 liter capacity saline reservoirs which may be more practical. The reservoir 16 is translucent so that the saline 18 level can be monitored through use and the reservoir 16 replaced once empty. The reservoir 16 has a neck 54, similar to a bottle neck on a bottle, which includes a sealed opening 56. The neck 54 guides the reservoir 16 into a complimentary opening 58 in the frame (shown in FIG. 4) and positions the reservoir 16 in the opening 58 so that a protrusion 60 in the opening (shown in FIG. 4) breaks the seal 62 to allow the saline 18 to flow from the reservoir 16 to the main feed line 30 when the reservoir 16 is mounted to the support frame 14.

The flow rates of the saline 18 through the anode 22 and cathode chambers 24 of the electrolytic cell 20 are important factors in achieving biocidal solutions 12 with predictable properties. A biocidal solution 12 having a pH of between 6.2 and 6.5 and an AFC level of between 150 to 420 ppm and typically of between 370 to 420 ppm is achieved by ensuring that the flow rate to the anode chamber 22 is metered at 24 liters per hour (400 ml per minute) and the flow rate to the cathode chamber 24 is metered at 0.96 liters per hour (16 ml per minute).

Figure 2:
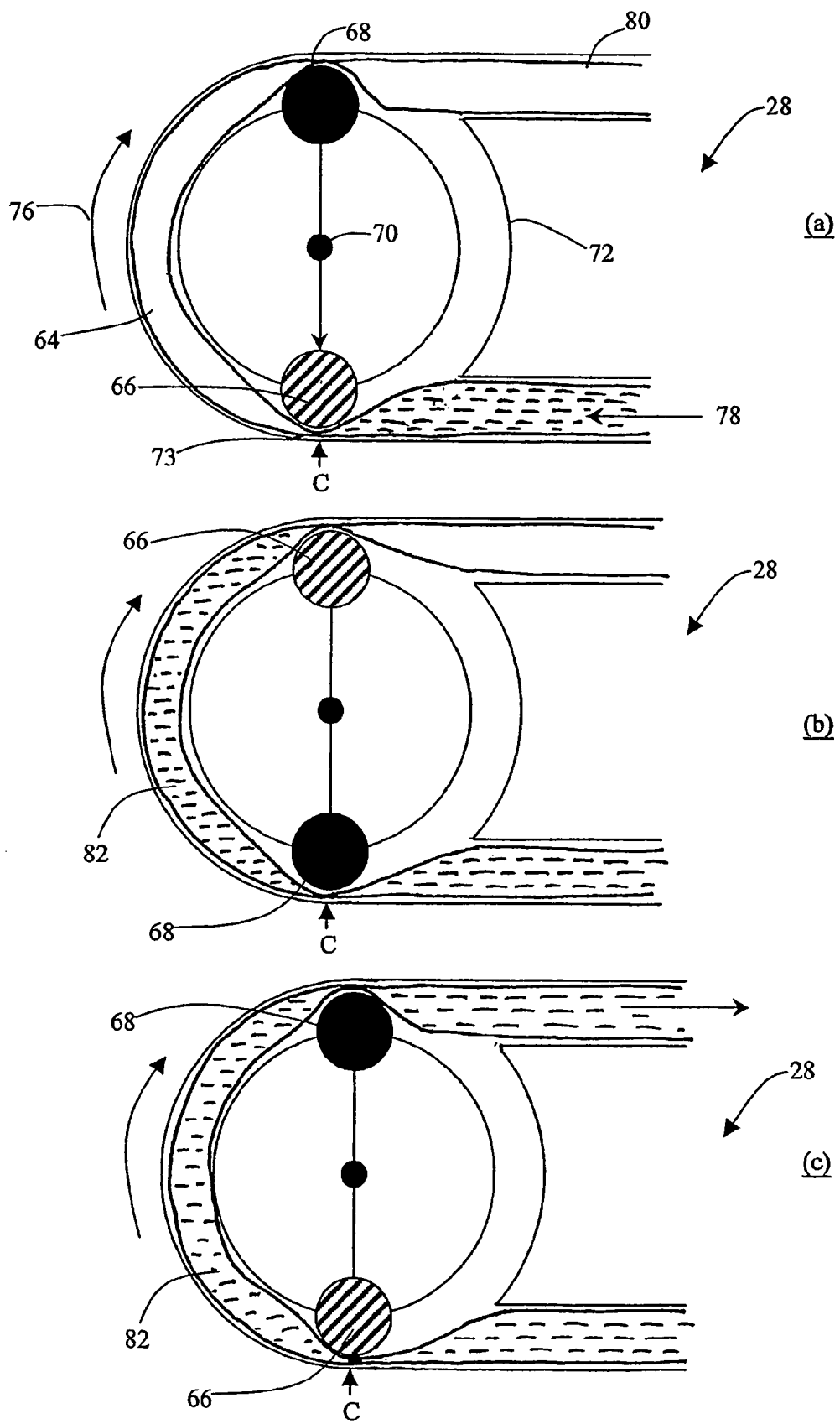
FIG. 2 is a schematic view of a two-roller peristaltic pump used, during the three stages of its cycle and included in the embodiment of FIG. 1.

These flow rates are set by the peristaltic pump 28 which can deliver accurately measured volumes of the saline 18 as will now be described with reference to FIG. 2. Peristaltic pumps operate on a positive displacement principle. Positive displacement of the saline 18 in the flexible and resilient tubing of the section of the main feed line 64 which is in contact with the pump 28 is created by two rollers, 66 and 68, rotating around a shaft 70 and progressively squeezing the tubing 64 against the pump housing 72.

In FIG. 2(a), the tubing 73 at point C is compressed by the roller 66 so that the flow of saline 18 through the tubing 64 is restricted. As the rollers 66, 68 continue to rotate in a clockwise direction, shown by the arrow 76 (FIG. 2(b)), the tubing 73 at point C recovers its original shape, creating a vacuum and drawing the saline 18 in behind it in the direction shown by the arrow 78. The squeezed area of the tubing 64 progresses with the rotating rollers 66, 68, forcing saline 18 to move in front of the roller which is constricting the tubing 64. As there is always at least one roller in contact with the tubing, no valves are required for prevention of backflow. In FIG. 2(c), the rollers 66, 68 have rotated another 180° from the position shown in FIG. 2(b), which delivers the saline 18 trapped between the two rollers 66, 68 into a delivery line.

The distance between the rollers 66, 68 creates a 'cushion' 82 of saline 18 which has a volume specific to the dimensions of the tubing 64 and the geometry of the rotor (i.e. the distance between the rollers 66, 68 and the shaft 70, the angle between the rollers 66, 68), and can therefore be accurately controlled.

The flow rate of the saline 18 pulsing through the tubing 64 is determined by the rotor speed.

In this embodiment, an "Autoclude" (trade mark) peristaltic pump (Model 500) is used having a 230 V±10%, 50 Hz electric motor and two polycarbonate rollers which are set to rotate at 176 rpm by a gearbox. Opaque thermoplastic tubing with a bore diameter of 4.8 mm is used as the resilient and flexible tubing 64 through the pump 28 which produces a saline flow rate of 23.64 liters per hour (394 ml per minute). Per revolution, approximately 2.2 ml of saline is discharged into the delivery line 80.

After being discharged from the peristaltic pump 28, via the delivery line 80, the saline flow is split between the anode and cathode feed lines 32, 34 such that the greater portion (96%) of saline 18 is fed to the anode chamber 22 and the lesser portion (4%) is fed to the cathode chamber 24. The flow rate of saline 18 through the cathode chamber 24 is much slower than in the anode chamber 22. The feed lines 32, 34 comprise clear PVC tubing with a 5 mm bore diameter and a 1.5 mm wall thickness. This tubing 32, 34 is also flexible to facilitate its arrangement within the support frame. The anode and cathode feed lines 32, 34 are connected to the tubing 64 passing through the peristaltic pump 28 by a simple and widely available 'Y' piece connector.

The restrictor valve 36 further controls the flow rate of the catholyte through the electrolytic cell 20 which in turn sets the pH of the final product 12. A higher flow rate of catholyte through the cathode chamber 24 results in a biocidal solution 12 with a higher pH. The exact mechanism of this process is not completely understood. However, it is thought to be related to the migration of hydroxide ions through the separator 26 in the electrolytic cell 20. The restrictor valve 36 is set to fix the catholyte flow rate at 16 ml per minute (0.96 liters per hour) to produce biocidal solution 12 with a pH within the range of 6.2 to 6.5.

FIG. 3 shows the electrolytic cell 20 which comprises co-axial cylindrical 84 and rod electrodes 86 separated by the separator 26 which is a semi-permeable ceramic membrane. The separator 26 is co-axially mounted between the electrodes 84, 86 thus splitting the space between the electrodes to form the two chambers, 22, 24. The cylindrical electrode forming the anode 84 is typically made from commercially pure titanium coated with an electrocatalytic (active) coating suitable for the evolution of chlorine from a chloride solution. The rod electrode forming the cathode 86 is made from titanium and machined from an 8 mm stock bar to a uniform cross-section over its effective length, which is typically about 210 mm±0.5 mm. The semi-permeable ceramic membrane forming a separator 26 and creating the anode and cathode chambers 22, 24 is composed of aluminium oxide (80%), zirconium oxide (18.5%) and yttrium oxide (1.5%), and has a porosity of about 50-70%, a pore size of 0.3 to 0.5 microns and a wall thickness of 0.5 mm+0.3 mm/−0.1 mm Saline 18 enters the anode and cathode chambers 22, 24 of the electrolytic cell 20 through the anode and cathode feed lines 30, 32 respectively.

The anode electrode 84 and the cathode electrode 86 are connected to the electrical circuit 46 to enable the current to pass across the anode and cathode chambers 22, 24. Whilst the cathode link 87 is by a crimp connection (not shown) on the end of the cell, the anode link 88 is by a blade hose which is clipped to the side of the cell (not shown).

When a current is applied across the cell 20, the saline 18 in the cell 20 undergoes electrochemical treatment resulting in biocidal solution 12 being produced in the anode chamber 22 and dispensed through the anode chamber outlet 40 to the dispensing means 38 which is in the form of a nozzle. The nozzle 38 then delivers the biocidal solution 12 to a receptacle 39 (shown in FIG. 4) for collection by the user. The output product 43 from the cathode is dispensed from the cathode chamber 24 through the cathode chamber outlet 44 into the waste reservoir 42. No plumbing is required but the waste reservoir 42 must be emptied regularly to prevent overflow.

To control further and provide a predictable AFC content of the biocidal solution 12, a fixed direct current of a constant 10 amps is supplied across the electrolytic cell 20 by transforming the alternating current 240 V mains power supply using the power pack 50. The power pack 50 comprises a toroidal step down transformer 90 of a capacity adequate for a single cell which reduces the mains voltage, and a bridge rectifier 92 which converts the alternating current to an unsmoothed direct current (see FIG. 5). The applied voltage is not important, as long as the current is stable.

Figure 4:
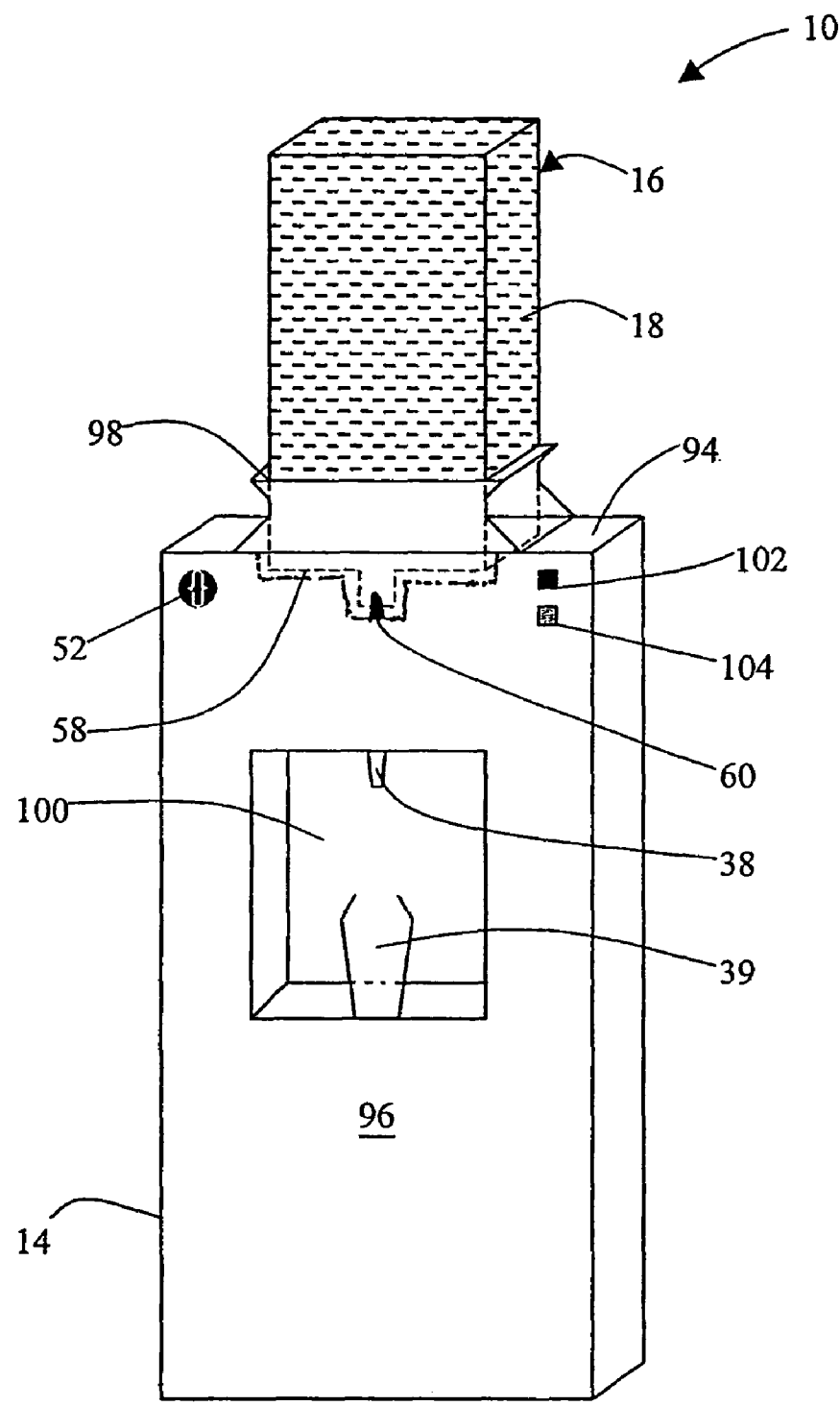
FIG. 4 is a schematic representation of a housing and a saline reservoir incorporated in the embodiment of FIG. 1.

In FIG. 4, the support frame 14 is in the form of a compact and portable housing having a top 94, a front face 96, a back face (not shown), two side faces (only one visible), and a bottom (not visible). The sealed and replaceable saline reservoir 16 is positioned vertically above and resting on a collar 98 on the top 94 of the housing 14, with the neck 54 of the reservoir being received in the housing opening 58. The collar 98 ensures the physical stability of the reservoir 16 when mounted to the housing. As described earlier, the protrusion 60 breaks the seal 62 when the reservoir 16 is mounted on the housing 14 to allow the saline 18 to flow into the main feed line 30. The housing 14 accommodates the main feed line 30, the peristaltic pump 28, the anode and cathode feed lines 32, 34, the restrictor valve 36, the electrolytic cell 20, the waste reservoir 42 for collecting the catholyte, and the electrical circuit 46 except the mains supply source 48 and the operator-controlled switch 52. Shelving and brackets (not shown) are provided within in the housing to support the peristaltic pump 28, the electrolytic cell 20, the power pack 50, the waste reservoir 42.

A niche 100 is provided in the front face 96 of the housing 14 for the user to place the receptacle 39 to collect the biocidal solution 12 being dispensed by the nozzle 38. The properties (AFC, pH) of the biocidal solution 12 are verified at regular intervals using commercially available test strips.

The operator-controlled switch 52 in this embodiment is in the form of a key switch and is located on the front face 96 of the housing 14. Two indicating lights, in the form of LEDs, one red 102 and one green 104, are also located on the front face 96 of the housing 14. The red LED 102 lights up when the device is 'live' i.e. connected to the mains supply source 48. The green LED 104 is connected to a pre-settable timer 106 and lights up three seconds after operation of the key switch 52 to indicate that the solution being dispensed from the nozzle 38 is ready for collection. This allows for any solution contained in the feed lines 30, 32, 34 (FIG. 1) and the electrolytic cell 20 i.e. 'dead' solution, to be purged and discarded by the user. The user can begin collecting the dispensed solution when the green LED 104 lights up. The discarded 'dead' solution drains into the waste reservoir 42.

Figure 5:
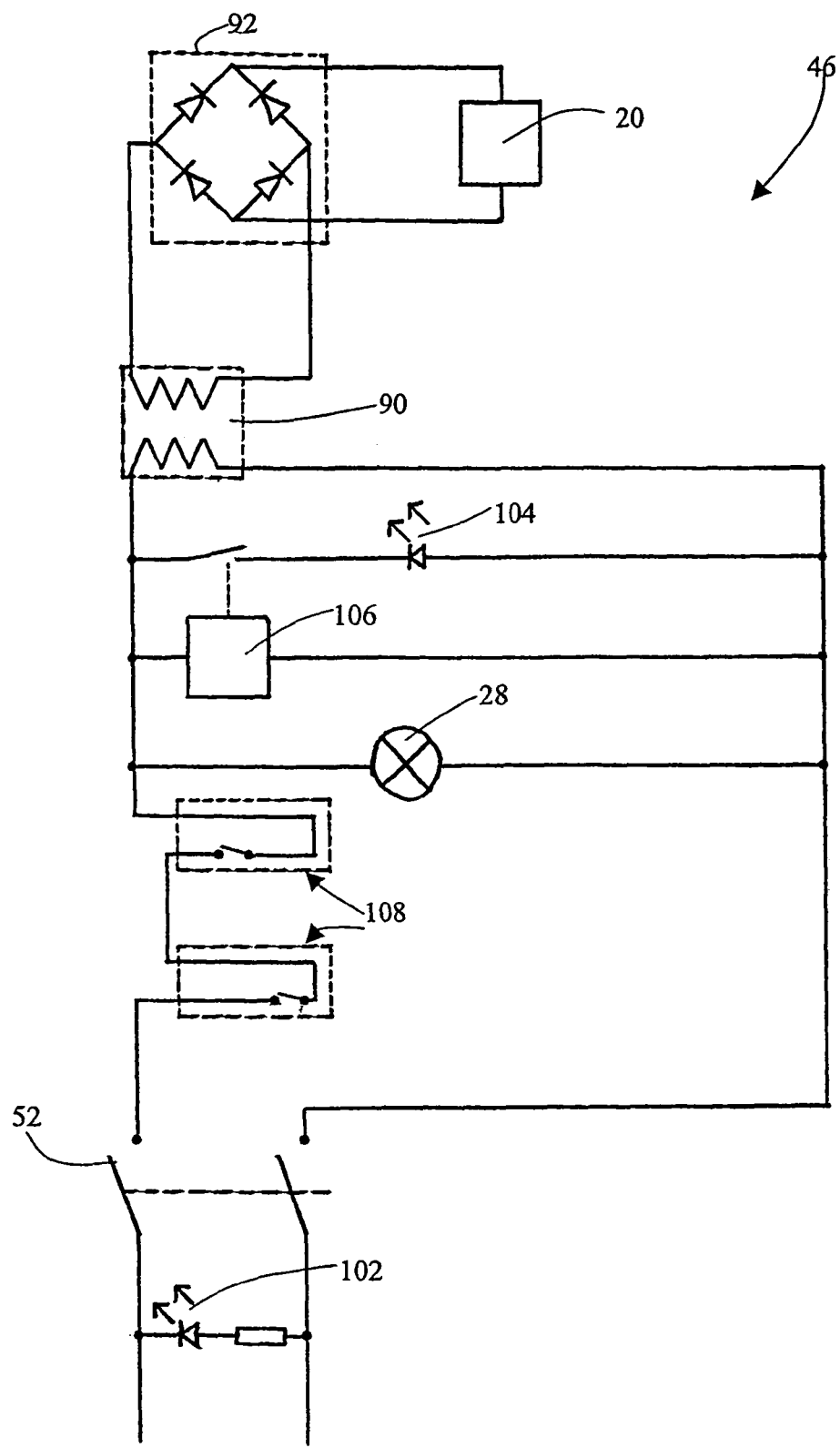
FIG. 5 is a electrical circuit diagram forming part of the embodiment of FIG. 1.

FIG. 5 shows the electrical circuit 46 connecting the electrolytic cell 20, peristaltic pump 28, the two LEDs 102, 104, the power pack 50 and the pre-settable timer 106 to the mains supply source 48. The device 10 is connectible to the mains supply source 48 simply by plugging the device 10 into a mains supply socket. Float switches 108 are also included in this device 10 for preventing overflow of the waste reservoir 42 by automatically disconnecting the mains supply source 48 to the device 10 if a pre-set limit is exceeded.

In operation, the key switch 52 activates the mains supply source 48 to the peristaltic pump 28 and the power pack 50 for the electrolytic cell 20 simultaneously. The output product is immediately dispensed through the nozzle 38. Biocidal solution 12 continues to be dispensed for as long as the key switch 52 is operated; the volume of biocidal solution 12 dispensed being based on the peristaltic pump pressure 28. When the key is released, production stops immediately.

Figure 6:
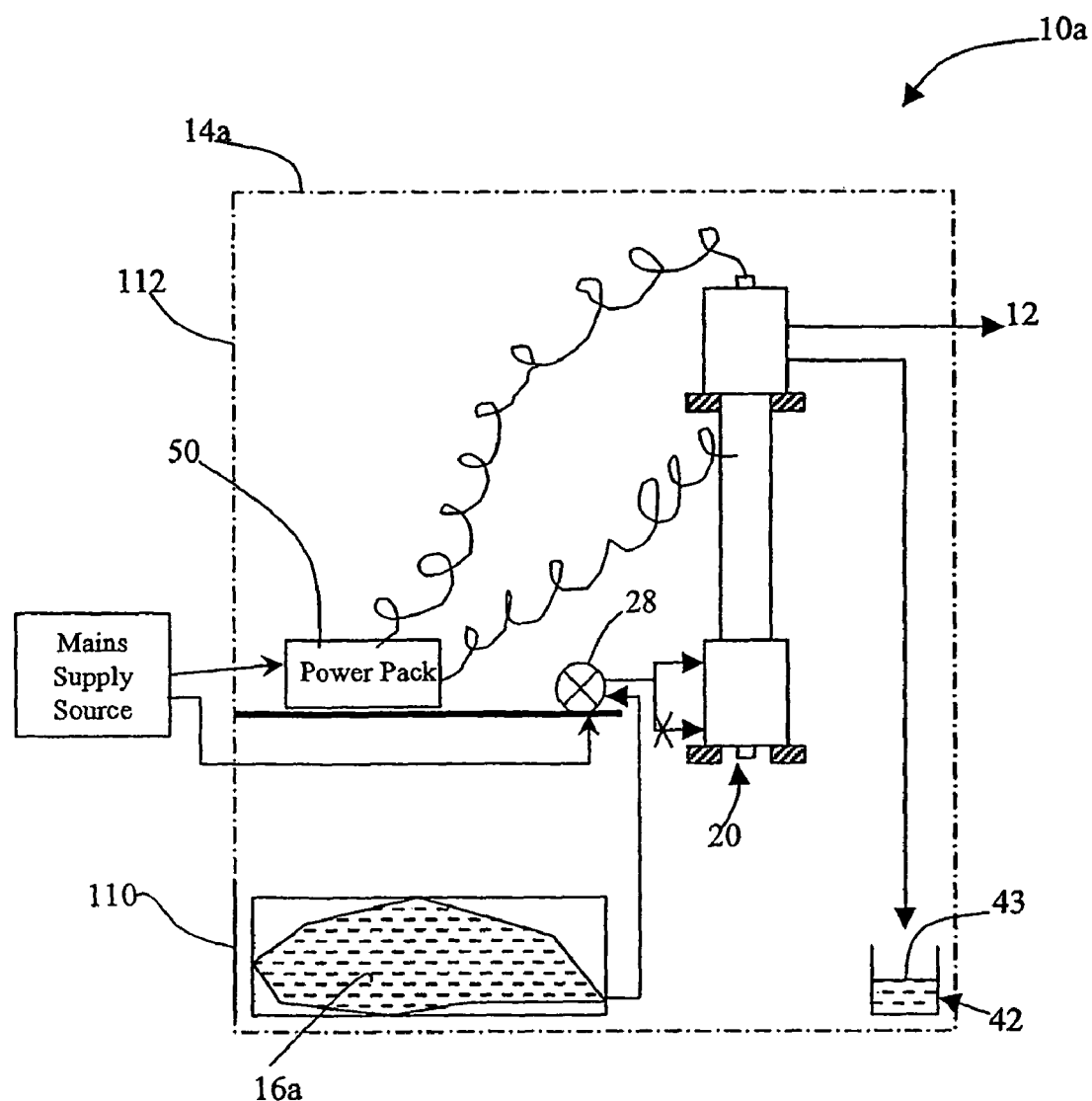
FIG. 6 is a schematic view of a second embodiment of the low volume dispenser device in accordance with the present invention.

The embodiment shown in FIG. 6 differs from that of FIGS. 1 and 5 in that the entire device 10a, including the saline reservoir 16a, is contained within a housing 14a (which is shown for clarity of illustration in chain lines). This is achieved by mounting the saline reservoir 16a in the bottom of the housing 14a, for which purpose a hatch 110 is provided in a side face 112 of the housing 14a. A float switch (not shown) illuminates a third LED (not shown) on the front face (not shown) of the housing 14a which indicates that the saline reservoir 16a requires replacing.

Figure 7:
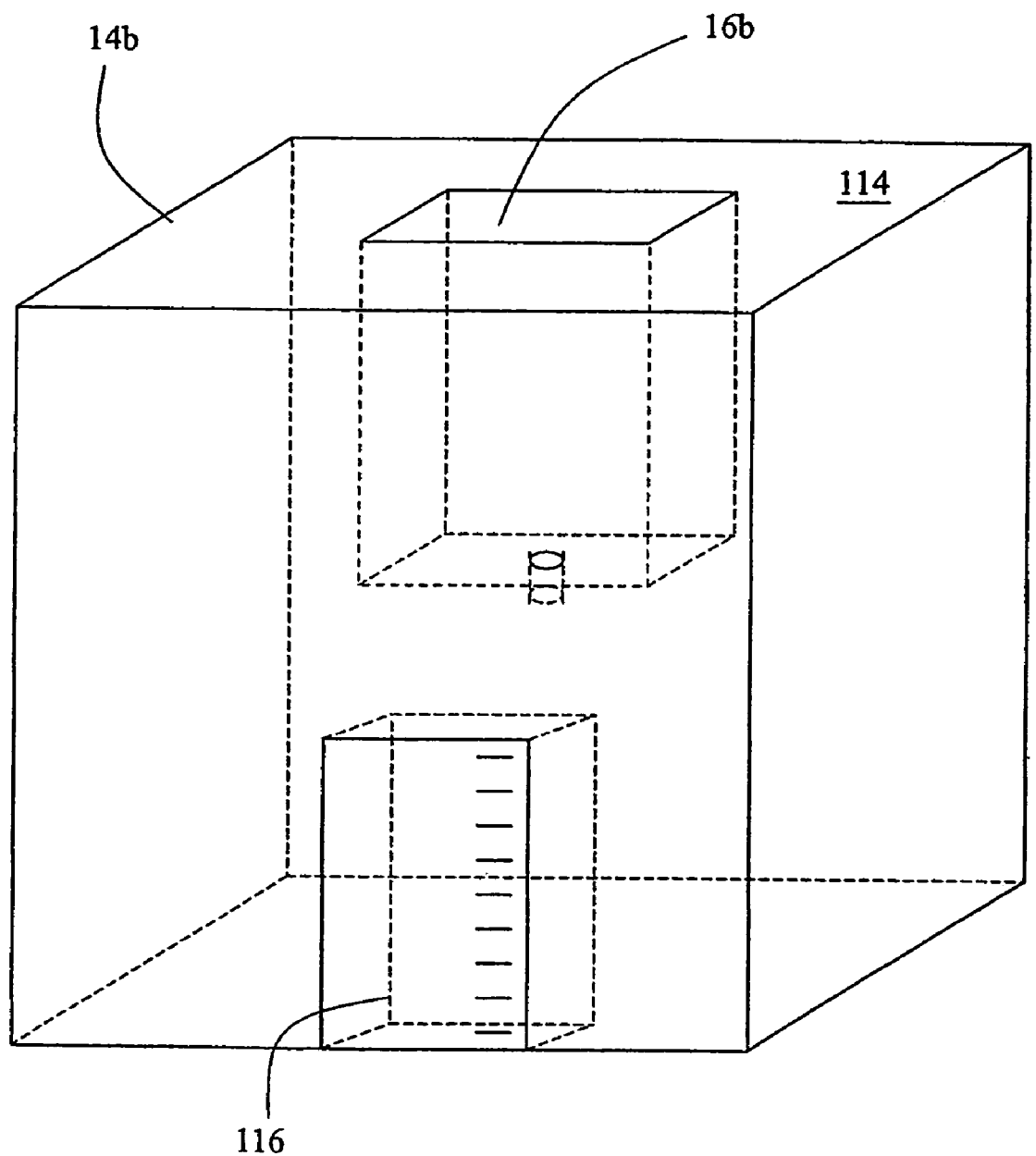
FIG. 7 is a schematic representation of a housing and a saline reservoir according to a third embodiment of the low volume dispenser device in accordance with the present invention.

The embodiment shown in FIG. 7 differs from that of FIGS. 1 and 5 in that the saline reservoir 16b is mounted to the support frame or housing 14b through a top face 114 of the housing 14b so that it is contained substantially within the outer walls of the housing 14b when mounted. The reservoir is connectable to the main feed line 30 (not shown) and hence to the pump 28 (not shown) in the same way as that described in relation to FIGS. 1 and 5 and so is not described here. The other components housed within the housing such as the electrolytic cell 20, power pack 50 etc. have been omitted from FIG. 7 for clarity. The biocidal solution is dispensed into a removable container 116 which is translucent and has vertical graduations so that the level of solution produced can be monitored. The saline reservoir 16b typically has a 10 liter capacity which makes this embodiment particularly suited to applications where compactness is of prime importance, in particular in dentist practices. Dentists tend to use aliquots of the sterilising solution and therefore require smaller saline reservoirs.

Figure 8:
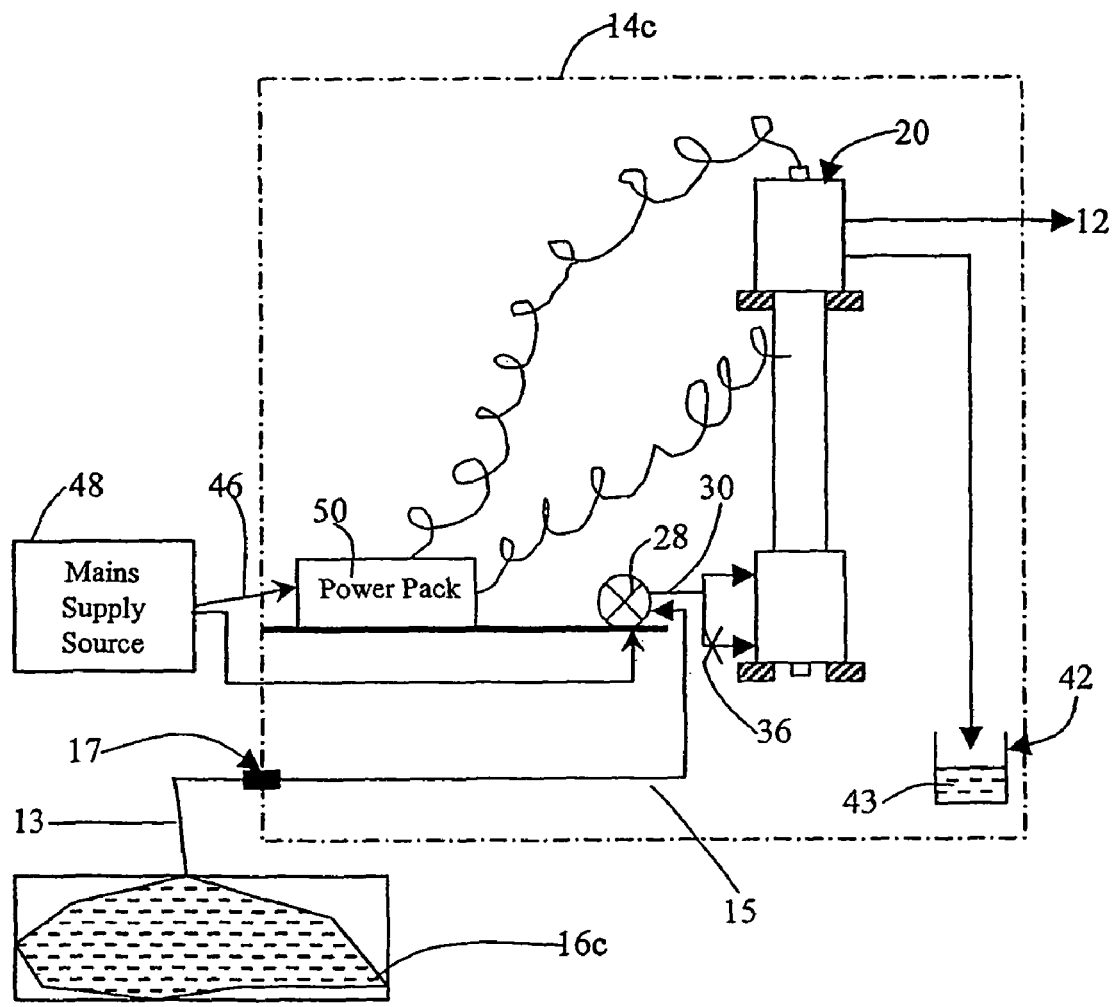
FIG. 8 is a schematic view of a fourth embodiment of the low volume dispenser in accordance with the present invention.

The embodiment shown in FIG. 8 is the Applicant's currently preferred embodiment and differs from that of FIGS. 1 and 5 in that the saline reservoir 16c has an 8 liter capacity, which is also smaller than the reservoir 16 of the first embodiment, and is in the form of a disposable boxed bladder container. The housing 14c in this particular embodiment is approximately 2 foot (60 cm) high, 1 foot (32 cm) deep and 1 foot (30 cm) wide. The reservoir 16c and the peristaltic pump 28 are connectable by two pipes 13, 15 leading from the reservoir 16c and the pump 28 respectively. A double-ended connector 17 provides a watertight and leak-proof connection between the two free ends of the pipes 13, 15, and hence the reservoir 16a and the peristaltic pump 28. In this embodiment, both pipes are flexible and typically made of rubber, but can be made of any other flexible material. It will be appreciated that the pipes can also be made of a rigid material.

The invention will now be further described by reference to the following example which sets out the AFC content and pH of a biocidal solution produced by the invention.

EXAMPLE

An 18 liter reservoir was used containing saline with a NaCl concentration of 3.5 grams per liter made by allowing the NaCl to dissolve overnight. The saline solution had a conductivity of 7.1. The peristaltic pump was set to run at 24 volts to deliver 24 liters per hour at 175 rpm. The electrolytic cell was driven at 9±1 volts, 9.9 amps. The pH and AFC content range of the biocidal solution over 5 assays, is as follows:

pH: 6.52 to 6.61

AFC level: 390 to 420 ppm

It should be appreciated that the invention is not limited to the particular embodiments described and illustrated, but includes all modifications and variations falling within the scope of the invention as defined in the appended claims. For example, the electrolyte can be any salt solution other than saline. Salt solutions of any predetermined concentration can be used as the electrolyte depending on the use of the final sterilising solution. Deionised water may be used to make up the saline. The low volume reservoir can have any low volume capacity depending on the application, provided that it is equal to or less than 30 liters. The reservoir container can be opaque rather than transparent or semi-transparent and a liquid level indicator included to indicate when the reservoir requires replacing. The housing may have different sizes and shapes depending on the application.

The salt solution reservoir need not be positioned vertically above the pump, it can be in any position in relation to the pump because the pump draws the solution from the reservoir. As mentioned earlier, the pump or the salt solution reservoir need not be contained in the housing. Instead of a peristaltic pump, any other means which meters known and controllable volumes or flow rates of the electrolyte to the electrolytic cell may be used, such as a positive displacement pump. In particular in countries where the standard mains voltage is not sufficient to overcome the static torque associated with peristaltic pumps, pumps other than peristaltic pumps may be used. It is to be appreciated that peristaltic pumps vary from model to model and will therefore probably require some fine tuning in order to achieve the results quoted above.

The device need not include a pre-settable timer if it is used constantly and 'dead' solution is not accumulating within the pipework.

The emptying of the waste reservoir and the replacing of the saline reservoir may be synchronised to prevent the waste reservoir overflowing by size matching both the reservoirs. This matching of sizes can be calculated by comparing the relative flow rates from the anode and cathode chambers and by allowing for the volume of 'dead' product which will also be purged into the waste reservoir when the unit switch is operated. For example, if the flow rate from the cathode chamber is 4% that of the flow rate from anode chamber, and the electrolyte volume in the reservoir is 18 liters, a waste reservoir with a capacity of more than 4% of the volume of the electrolyte in the reservoir (>750 ml) must be provided. Obviously, the synchronised waste reservoir emptying and saline reservoir replacing cycle is efficient only when the cycle is started with an empty waste reservoir and a full saline reservoir.

The AFC content and pH level of the biocidal solution can be varied depending on the requirements of a particular application by changing the flow rate through the cell e.g. increasing the flow rate but keeping the current the same results in a weaker biocidal solution.

The rate of biocidal solution production may be increased by connecting more than one cell together, e.g. 2, 4 or 6 cells etc., in parallel.

The key switch can also be a push button or the like. A time delay can be incorporated into the device so that the key switch/button does not need to be manually released to stop production of the biocidal solution i.e. when the user operates the key switch/button the biocidal solution will continue to be produced for a predetermined length of time and then stop.

The restrictor valve may be replaced by any other suitable form of restrictor providing that it restricts the flow rate of the catholyte through the cathode chamber.

The invention claimed is:

1. A device for producing a biocidal solution including:
   a support frame;
   a sealed and replaceable reservoir having a low volume capacity, adapted to be mounted to the support frame and containing a pre-prepared aqueous salt solution having a pre-determined concentration;
   means for breaking the seal of the reservoir when the reservoir is mounted to the support frame;
   an electrolytic cell for electrochemically treating the aqueous salt solution, that is mounted to the support frame, that is connectible to the reservoir, and that has an anode chamber for delivering a biocidal solution from the electrolytic cell, and a cathode chamber, said anode and cathode chambers being separated by a separator;
   a pump, mounted to the support frame and in communication with the reservoir when the reservoir is mounted to the support frame, for delivering a split flow of accurately measured volumes of the aqueous salt solution from the reservoir to the anode and the cathode chambers of the electrolytic cell to control the flow rate of the aqueous salt solution to the electrolytic cell, the flow to the anode chamber comprising about 95-97% by volume of the aqueous salt solution and the flow to the cathode chamber comprising about 3-5% by volume of the aqueous salt solution, said pump being in communication with the reservoir through a main feed line made from a flexible and resilient material and to the anode and cathode chambers by an anode feed line and a cathode feed line respectively;
   a restrictor valve incorporated in the cathode feed line for controlling further the flow rate of the aqueous salt solution to the cathode chamber;
   dispensing means for receiving the biocidal solution from an anode chamber outlet;
   a waste reservoir for receiving an output from the cathode chamber outlet, said output in its entirety to be discarded;
   an electrical circuit for connecting the pump and the electrolytic cell to a mains supply source;
   a power pack included in the electrical circuit between the electrolytic cell and the mains supply source to provide a substantially constant direct current of 7 to 12 amps to the electrolytic cell; and
   an operator-controlled switch included in the electrical circuit for completing the electrical circuit when the switch is operated;
   whereby operation of the switch energises the pump to deliver the flow of aqueous salt solution and the electrolytic cell to produce the biocidal solution having a pre-determined level of available free chlorine and pH.

2. A device as claimed in claim 1, characterised in that the pump is a peristaltic pump.

3. A device as claimed in claim 1 or claim 2, characterised in that the power pack includes a transformer and a bridge rectifier to produce the substantially constant direct constant to the electrolytic cell.

4. A device as claimed in claim 1, characterised in that the substantially constant direct current supplied to the electrolytic cell is 10 amps.

5. A device as claimed in claim 1, characterised in that the biocidal solution continues to be dispensed until operation of the switch ceases.

6. A device as claimed in claim 5, characterised in that the switch ceases after expiration of a predetermined time period.

7. A device as claimed in claim 1, characterised in that the switch is a key switch.

8. A device as claimed in claim 1, characterised in that the electrical circuit also includes a pre-settable timer and an indicating light which lights up after a pre-set time after the switch has been operated to indicate that the solution being dispensed is ready for collection to allow any solution contained in the device previous to the switch being operated to be purged from the device.

9. A device as claimed in claim 1 wherein the flow of the aqueous salt solution to the anode chamber comprises about 24 liters per hour and the flow of the aqueous salt solution to the cathode chamber comprises about 0.96 liters per hour.

10. A device as claimed in claim 1 wherein the biocidal solution comprises a pH of between 6.2 and 6.5.

11. A device as claimed in claim 1 wherein the low volume capacity comprises a volume of no more than 30 liters.

12. A device as claimed in claim 1 wherein the flow to the anode chamber comprising about 96% by volume of the aqueous salt solution and the flow to the cathode chamber comprising about 4% by volume of the aqueous salt solution.

* * * * *